United States Patent [19]

Dixon et al.

[11] Patent Number: 4,704,582

[45] Date of Patent: Nov. 3, 1987

[54] GATED DEMODULATOR FOR SHAPED BPSK SIGNALS

[75] Inventors: Charles E. Dixon, Tempe; Christopher D. Broughton, Mesa, both of Ariz.

[73] Assignee: Motorola, Inc., Schaumburg, Ill.

[21] Appl. No.: 916,354

[22] Filed: Oct. 7, 1986

[51] Int. Cl.⁴ .......................................... H04L 27/22
[52] U.S. Cl. .................................. 329/50; 329/104; 329/124; 329/136; 375/81; 375/82; 375/83; 375/104
[58] Field of Search ............... 329/50, 104, 110, 122, 329/124, 131, 132, 136, 178; 455/210, 212, 222, 223, 224, 260, 295, 265, 309, 312; 375/81, 82, 83, 94, 99, 104, 120

[56] References Cited

U.S. PATENT DOCUMENTS 4,614,910 9/1986 Ishigaki et al. ................. 329/124 X Primary Examiner—Siegfried H. Grimm
Attorney, Agent, or Firm—Maurice J. Jones, Jr.; Eugene A. Parsons

[57] ABSTRACT

A demodulator for shaped BPSK signals that utilizes switches which have switching control means designed to eliminate unwanted Q channel signal power and unwanted carrier phase error signal power by opening the switches during the phase transition portions of the shaped BPSK signals. The switching control means close the switches during non-transitional portions of the shaped BPSK signals.

4 Claims, 3 Drawing Figures

GATED DEMODULATOR FOR SHAPED BPSK SIGNALS

BACKGROUND OF THE INVENTION

The present invention pertains to demodulators, and more specifically, demodulators for shaped binary phase shift keyed (shaped BPSK) signals. Shaped BPSK modulation is similar to conventional BPSK modulation except, in shaped BPSK modulation, abrupt phase transitions are avoided and the spectrum occupies a smaller bandwidth. Shaped BPSK modulation is useful in radio equipment applications where only a narrow satellite channel is available for relaying the signal. Effective demodulation of shaped BPSK signals is made difficult since the portion of the signal caused by the linear phase transition of the shaped BPSK signal causes unwanted signal power in a Q channel of a demodulator. Conventional demodulators, such as Costas demodulators, are unable to eliminate, or at least minimize, this unwanted Q channel signal power and, therefore, such a demodulator fails to track shaped BPSK signals having a high data transition. Also, carrier lock detectors based upon comparisons of relative power levels of an I channel and a Q channel fail because of the unwanted Q channel signal power.

SUMMARY OF THE INVENTION

Accordingly, it is an object of the present invention to provide a new and improved demodulator for shaped BPSK signals.

It is another object of the present invention to provide a new and improved demodulator for shaped BPSK signals which minimizes the Q channel signal power of the demodulator and therefore allows for effective carrier lock detection.

A further object of the present invention is to provide a new and improved demodulator capable of tracking shaped BPSK signals having a high data transition density.

These objects of the present invention will become apparent to those skilled in the art upon consideration of the accompanying specification, claims and drawings.

In order to obtain the above-mentioned and additional objects, the present invention employs the use of controlled switches (or gates) to "chop out" the linear phased transition portion of the shaped BPSK signal which causes the unwanted signal power in the Q channel of the demodulator.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
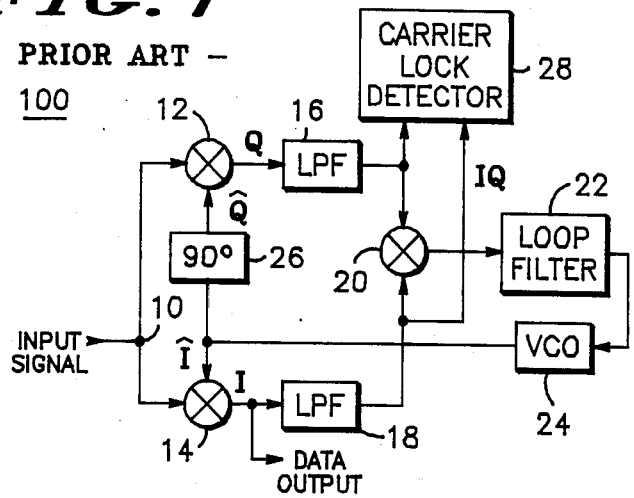
FIG. 1 is a block diagram of a prior art Costas BPSK demodulator.

Referring specifically to FIG. 1, a prior art Costas demodulator generally labeled 100 is shown with an input node 10 which is capable of receiving a modulated input signal. Node 10 is connected to an input of a multiplier 12 and an input of a multiplier 14. Multiplier 12 has an output connected to a low pass filter 16 and multiplier 14 has an output connected to low pass filter 18. Outputs of low pass filter 16 and low pass filter 18 form inputs to a multiplier 20. An output of multiplier 20 is fed through a loop filter 22 and then to a voltage controlled oscillator 24. The signal from voltage controlled oscillator 24 forms another input of multiplier 14 and also is fed through a 90° phase shifter 26 and back to form another input of multiplier 12.

It should be apparent to those skilled in the art that the output of multiplier 12 is known as a Q (quadrature) output and the output of multiplier 14 is known as an I (in-phase) output. Furthermore, the input of multiplier 20 supplied by low pass filter 16 is known as a Q channel output while the input of multiplier 20 supplied from low pass filter 18 is known as an I channel output. The output of multiplier 20 is commonly referred to as a carrier phase error signal. The carrier error signal is modified by loop filter 22 and causes the output of voltage controlled oscillator 24 to become phase locked to input carrier signal 10.

An optional lock detector circuit 28 may be connected between lowpass filter 16 and lowpass filter 18. Effectively, carrier lock detector circuit 28 compares the Q channel output signal power to the I channel output signal power and indicates carrier lock when almost all the signal power is being supplied by the I channel output. Unfortunately, as shown in waveform c in FIG. 3, the Q channel output signal power is not zero during the phase transition portions of the shaped BPSK modulated input of waveform b in FIG. 3. Therefore, the carrier lock detector circuit 28 fails to indicate carrier lock properly due to the unwanted Q channel signal power.

Figure 3:
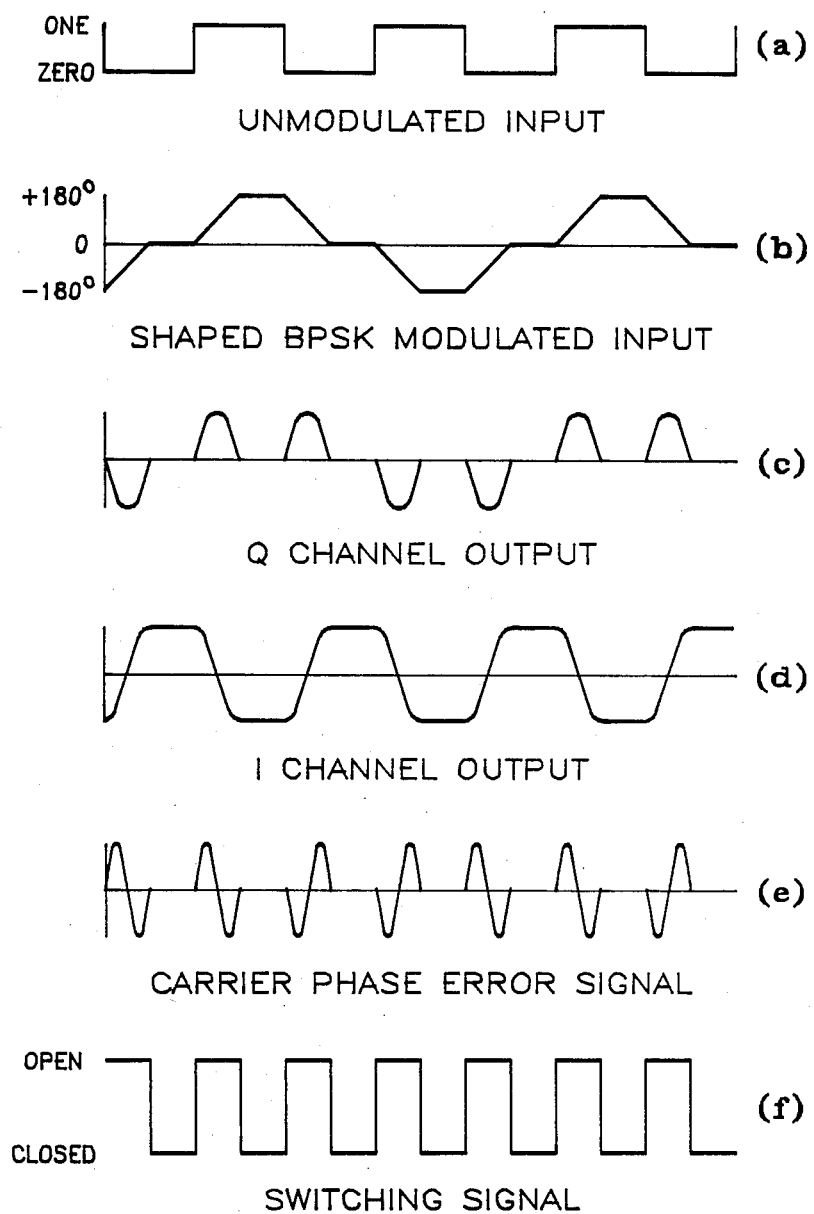
FIGS. 3, a, b, c, d, e, and f are wave forms associated with the shaped BPSK demodulator of FIG. 2 with one-zero inputs.

Experimental analysis also shows that shortly after the carrier lock detector circuit fails to indicate carrier lock, Costas demodulator 100 does indeed fail to track shaped BPSK signals having a high data transition density. The one-zero pattern of waveform a in FIG. 3 represents the worst case situation in this regard. The unwanted carrier phase error signal, shown in waveform e in FIG. 3, causes the voltage controlled oscillator 24 to loose phase lock with input carrier signal 10.

Figure 2:
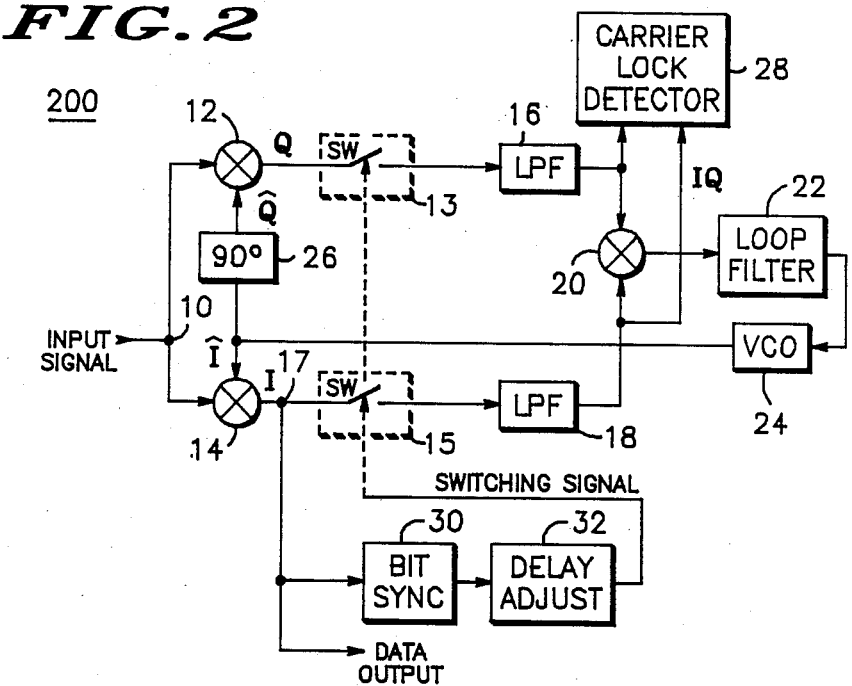
FIG. 2 is a block diagram of a shaped BPSK demodulator embodying the present invention.

Referring specifically to FIG. 2, a gated demodulator, generally labeled 200, is shown. Gated demodulator 200 is similar to Costas demodulator 100; however, a first switch 13 has been implemented between multiplier 12 and low pass filter 16 and a second switch 15 has been implemented between multiplier 14 and low pass filter 18. A data output node 17, positioned between multiplier 14 and switch 15 supplies a signal through bit synchronizer 30 and then onto a delay adjust 32. A resultant switching signal from delay adjust 32 controls the opening and closing of switches 13 and 15.

Bit synchronizer 30 and delay adjust 32 are designed so that switches 13 and 15 are open during the phase transition portions of the shaped PBSK modulated input. This eliminates most of the unwanted Q channel output signal power and also most of the unwanted carrier phase error signal power which causes the failure of carrier lock detector circuit 28 and tracking failure as mentioned above.

The wave forms of FIG. 3 will most effectively describe the functioning of demodulators 100 and 200. FIG. 3a shows an unmodulated one-zero input. The shaped BPSK modulated input of waveform b in FIG. 3 is the signal supplied to input node 10. In this example, an unmodulated input "0" in FIG. 3a results in a shaped BPSK modulated input of 0° whereas an unmodulated input "1" results in a shaped BPSK modulated input of ±180°. When changing from a "1" to a "0" or vice versa, the shaped BPSK modulated input changes linearly with time over a time interval of ½ bit and then dwells at the destination phase for the remaining ½ bit period. The direction of phase rotation of waveform b in FIG. 3 alternates in groups of two, i.e., two rotations in one direction followed by two rotations in the opposite direction. The sloped portions of the waveform b in FIG. 3 are known as the phase transition portions of the shaped BPSK modulated input signal.

The waveform c in FIG. 3 illustrates the Q channel outputs of either demodulator 100 or demodulator 200. The unwanted signal power during the phase transition portions of waveform b in FIG. 3 should be noted. This is what causes the failure of carrier lock detector circuit 28.

The waveform d in FIG. 3 shows the wave form at the I channel output of demodulators 100 or 200. During the phase transition portions of waveform b in FIG. 3 the signal power level of the I channel output is also in transition.

The waveform e in FIG. 3 displays the carrier phase error signal which is the output of multiplier 20 of demodulators 100 or 200. The waveform e in FIG. 3 is simply the result of multiplying the waveform c of FIG. 3 by the waveform d of FIG. 3. The signal power of waveform e in FIG. 3 causes the voltage controlled oscillator 24 to loose phase lock with input carrier signal 10.

The switching signal illustrated in waveform f in FIG. 3 is what distinguishes demodulator 200 from Costas demodulator 100. It should be noted that the signal of waveform f in FIG. 3 causes switches 13 and 15 to be open during the phase transition portion of waveform b in FIG. 3. This effectively "chops out" the unwanted signal power in both waveforms c and d in FIG. 3 and also eliminates the transition portion of waveform d in FIG. 3. This switching capability of demodulator 200 eliminates the previously mentioned problems associated with demodulator 100.

While a pair of switches (13 and 15) have been implemented in FIG. 2 to perform the "chopping out" of unwanted signal power, it will be understood by those skilled in the art that a single switch in front of node 10 might be utilized to achieve the same result. Thus, while we have shown and described a specific embodiment of this invention, further modification and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. A method of demodulating a shaped BPSK input signal having linear phase transitions between destination phase dwells comprising the steps of chopping out the portion of the BPSK signal caused by the linear phase transition of the shaped BPSK input signal, and demodulating the destination phase dwells.

2. A demodulator comprising:
   an input node capable of receiving a modulated signal;
   first and second multiplier means connected to said input node;
   a first low pass filter circuit coupled to said first multiplier means;
   a second low pass filter circuit coupled to said second multiplier means;
   switching means coupled between said first multiplier means and said first low pass filter and also between said second multiplier means and said second low pass filter;
   third multiplier means having inputs supplied by said first low pass filter circuit and said second low pass filter circuit;
   a loop filter coupled to said third multiplier means;
   a voltage controlled oscillator connected between said loop filter and said second multiplier means;
   a ninety degree phase shifter coupled between said first multiplier and said voltage controlled oscillator;
   a data output node positioned between said second multiplier means and said switching means; and
   switching control means between said data output node and said switching means.

3. A demodulator as recited in claim 2 wherein said switching control means includes a bit synchronizer and a delay adjust.

4. A demodulator as recited in claim 2 additionally comprising a carrier lock detector circuit connected to the inputs of said third multiplier means.

* * * * *